(No Model.)
A. S. ATWATER.
DYNAMO ELECTRIC MACHINE.
No. 505,184.  Patented Sept. 19, 1893.
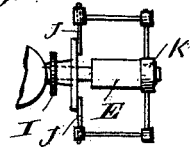
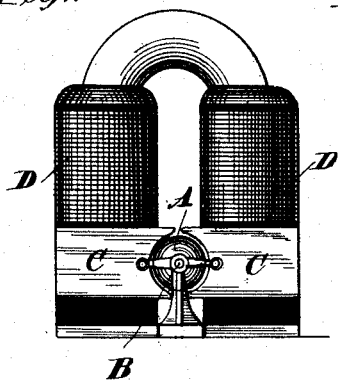
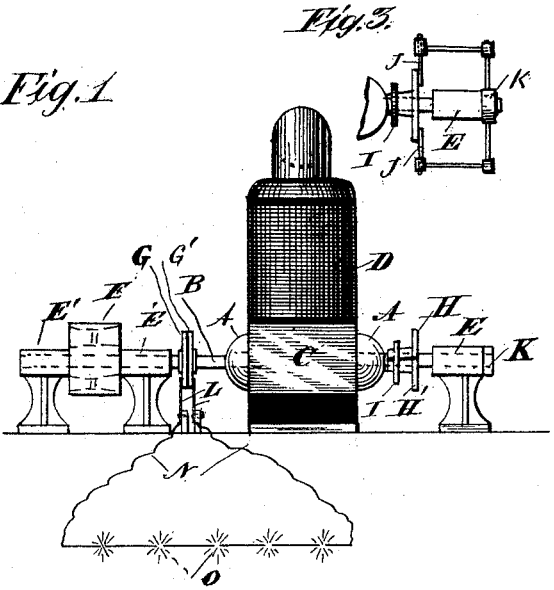
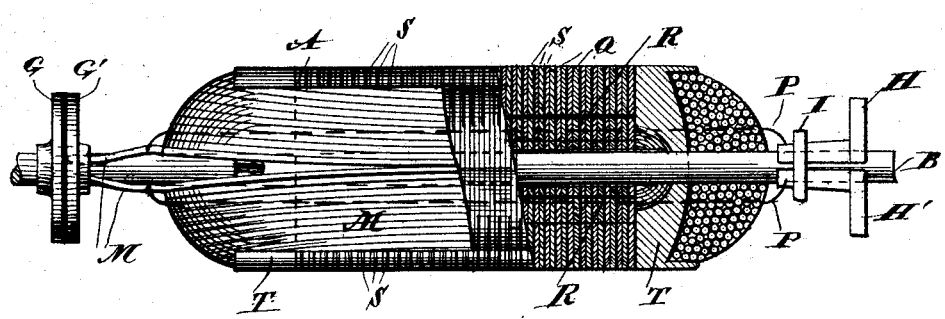
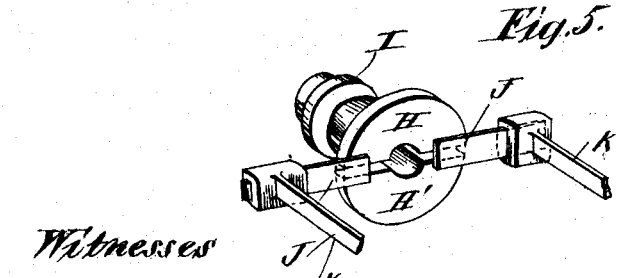
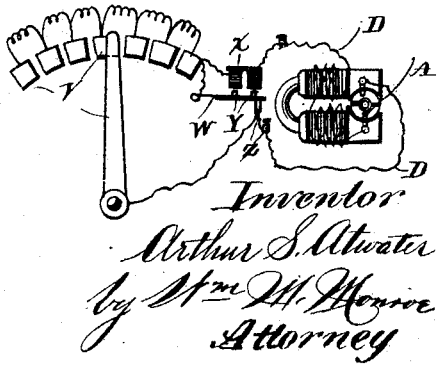
Witnesses
Frank B. Many
Inventor
Arthur S. Atwater
by Wm. M. Monroe
Attorney

UNITED STATES PATENT OFFICE.

ARTHUR S. ATWATER, OF CLEVELAND, OHIO, ASSIGNOR TO THE ATWATER GENERAL ELECTRIC COMPANY, OF SAME PLACE.

DYNAMO-ELECTRIC MACHINE.

SPECIFICATION forming part of Letters Patent No. 505,184, dated September 19, 1893.

Application filed January 16, 1893. Serial No. 458,591. (No model.)

*To all whom it may concern:*

Be it known that I, ARTHUR S. ATWATER, a citizen of the United States, and a resident of Cleveland, county of Cuyahoga, State of Ohio, have invented certain new and useful Improvements in Dynamo-Machines, of which I hereby declare the following to be a full, clear, and exact description, such as will enable others skilled in the art to which it appertains to make and use the same.

My invention relates to improvements in dynamo machines in which the field coils are excited to their full power by means of a shunt circuit derived from the armature coil.

My invention is especially designed as a completion of the dynamo, in which is employed the armature described in the Letters Patent No. 411,950, granted to me October 1, 1889, where I have shown a ventilated armature wound with a single coil.

My invention consists in the combination and arrangement therewith of a commutator and collector rings, the controlling mechanism, and the construction of details, as hereinafter described, shown in the accompanying drawings and more specifically pointed out in the claim.

In the drawings Figure 1 is a side elevation of my complete dynamo. Fig. 2 is an end view of the same. Fig. 3 is a plan of commutator and brushes. Fig. 4 is an enlarged view of armature partly broken away to show the construction. Fig. 5 is a detail of the commutator, and Fig. 6 is a rheostat placed in the shunt or field circuit.

In the drawings A, is the armature; B, the main shaft, upon which it is placed; C, the pole pieces; D, the field coil; E, and E', the bearings; F, the pulley; G, G', the collector rings; H, H' the commutator sections; I, the commutator clamping ring; J, the commutator brushes; K, the brush arm; L the collector brushes; M the coarse wire coil about the armature; N, the lamp circuit; O the lamps in series, and P, the shunt which excites the field circuit. It will be seen that the shunt circuit P, is derived from the positive and negative extremities of the armature coil, whence it proceeds to the commutator sections I, and is thence continuous through the brushes J, J, and field coil D.

In my former patent, I described the laminated and ventilated plates Q, which form the core of the armature perforated longitudinally at R. and radially stamped to form air passages S; T, being terminal plates of soft iron of similar transverse section.

In this invention, I combine the essential elements to complete a working device with a single coil about the armature.

It will be seen that both the duplex commutator, and the collector rings, are insulated from the main shaft and from one another, and the brushes engage the faces of the rings and commutator sections instead of bearing upon their peripheries, the object of which is to lessen the friction and wear of parts, the movement of the end faces being comparatively less than that of their peripheries. This is clearly seen in Fig. 5. The brush bearings should be arranged as seen to admit of longitudinal movement of the brushes. A chief advantage of this arrangement lies in the fact that the point of commutation will remain the same as long as the brushes last. The coarse winding coil of the armature will be seen to generate the current for the lamps, and being unbroken, will, of course, be alternating, while the shunt circuit through the fine wire and commutator will make a continuous field circuit, that is will not be reversed. Increased strength is given to the shaft by the double bearings on either side of the pulley, and thereby a smaller shaft can be employed with greater bearing surface. The commutator ring I should be composed of some insulating substance, as vulcanite or fiber.

At Fig. 6, V is seen a rheostat within the field circuit. This rheostat is provided with the cut-out W whereby the current will be short circuited from the rheostat, while the machine is not in use, and on starting up will continue to cut out the rheostat until the current generated becomes normal in strength, when the magnet X. within the circuit will become sufficiently excited to raise the armature Y, which crosses the circuit at Z, and throw the rheostat within the circuit with sufficient resistance required between the field coils and commutator. The necessity of this device is obvious since in starting the machine there would not be sufficient current generated in the shunt circuit to excite the field to the full capacity of the rheostat. Again when from any cause the resistance in the lamp circuit is lessened the cut out will operate to relieve the resistance in the field circuit.

Having described my invention, what I claim as new, and desire to secure by Letters Patent, is—

In a dynamo machine, the combination of a ventilated armature, a single coarse wire coil about the armature having its terminals in collecting rings upon the main shaft, a shunt field exciting coil connecting the terminals of the coarse wire coil and the sections of a duplex commutator, a field circuit having its terminals in radial brushes engaging the said sections and a rheostat in said field circuit provided with an automatic cutout whereby the rheostat is cut out of the circuit until a normal current has been generated, substantially as described.

ARTHUR S. ATWATER.

Witnesses:
WM. M. MONROE,
JOHN T. LISTER.